US008121913B2

(12) United States Patent
Bracken et al.

(10) Patent No.: US 8,121,913 B2
(45) Date of Patent: Feb. 21, 2012

(54) ARCHITECTURE FOR ACCOUNT RECONCILIATION

(75) Inventors: James Bracken, Olathe, KS (US); Brandon Mayer, Overland Park, KS (US)

(73) Assignee: Swiss Reinsurance Company Ltd., Zurich (SE)

(*) Notice: Subject to any disclaimer, the term of this patent is extended or adjusted under 35 U.S.C. 154(b) by 1460 days.

(21) Appl. No.: 10/643,514

(22) Filed: Aug. 19, 2003

(65) Prior Publication Data

US 2005/0044015 A1    Feb. 24, 2005

(51) Int. Cl.
*G07F 19/00* (2006.01)
*G07F 7/10* (2006.01)
(52) U.S. Cl. ............................. 705/33; 705/35
(58) Field of Classification Search ........................ None
See application file for complete search history.

(56) References Cited

U.S. PATENT DOCUMENTS

| | | | | |
|---|---|---|---|---|
| 5,093,787 A | * | 3/1992 | Simmons | 705/33 |
| 5,134,564 A | * | 7/1992 | Dunn et al. | 705/33 |
| 5,225,978 A | * | 7/1993 | Petersen et al. | 705/33 |
| 5,704,044 A | * | 12/1997 | Tarter et al. | 705/4 |
| 6,023,705 A | * | 2/2000 | Bellinger et al. | 707/200 |
| 7,263,527 B1 | * | 8/2007 | Malcolm | 707/102 |
| 7,340,421 B1 | * | 3/2008 | Marcial et al. | 705/30 |
| 7,346,667 B2 | * | 3/2008 | Ashcroft et al. | 709/219 |
| 7,363,261 B2 | * | 4/2008 | Whitehead et al. | 705/30 |
| 7,451,103 B1 | * | 11/2008 | Boyle et al. | 705/35 |
| 2003/0074288 A1 | * | 4/2003 | Quine | 705/33 |
| 2005/0131780 A1 | * | 6/2005 | Princen | 705/30 |
| 2007/0179870 A1 | * | 8/2007 | Goodbody et al. | 705/30 |

OTHER PUBLICATIONS

"T-Recs—making exception resolution a collaborative process in a fully audited envionmnet" URL http://www.chessys.com/products/trecs.html; printed from the internet on Feb. 2, 2005, 1 page.
"Reconciliation Solutions" URL http://www.checkfreecorp.com/cda/corp/L5.jsp?layoutID=50065&contentId=500468&menuId=119; printed from the Internet on Feb. 2, 2005; 2 pages.
"The ACR Essentials Software Suite" URL http://www.unitechsys.com/products/products.asp, printed from the Internet on Feb. 2, 2005, 1 page.
"Solutions-Overview" URL http://xrt.com/online/eng/pages/56, printed from the Internet on Feb. 2, 2005, 1 page.

* cited by examiner

*Primary Examiner* — Luna Champagne
(74) *Attorney, Agent, or Firm* — Oblon, Spivak, McClelland, Maier & Neustadt, L.L.P.

(57) ABSTRACT

An architecture and methodology provides a uniform approach for reconciling accounts in a manner that ensures proper controls, both legal and financial, are being met. In the described implementation, the architecture offers a web-based solution that facilitates online account reconciliation in a central and controlled method across many different divisions and business units, located within in the U.S. or around the world. The system architecture enables creation and maintenance of reconciliation profiles that define how different accounts are to be reconciled. The system architecture further supports creation of reconciliation documentations, based on the reconciliation profiles, which are used to reconcile individual accounts.

15 Claims, 11 Drawing Sheets

| Edit Profile | | | |
|---|---|---|---|
| Profile Code | 01-234-56789 | Profile Status | DRAFT |
| Profile Site | 09 | Profile Owner | Smith, Joe |
| | | Preparer | Smith, Joe |
| Legal Entity | ABC Co | Final Reviewer | Jones, Sue |
| Business Account Type | CASH | Is Dual Review required | ☑ |
| Function | TRS | First Reviewer | Tran, David |
| Check points Activated | ☐ | Item Type | |
| Reconciliation Risk | ● High ○ Medium | Reconciliation Frequency | ● Monthly ○ Quarterly |
| Profile Description | Cash in Bank | | |
| Profile purpose | This account is used to send and receive cash payments on behalf of this company | | |
| Typical Transaction Summary | Typical transactions include wire receipts and disbursements related to normal business activity; might include cash movements from premium collection accounts or to disbursements; additionally, third... | | |
| Profile Supplementary Information | This is account is held at Bankers Trust. | | |

Profile Lines

Item 0 - 0 of 0                                    Add New
No ProfileLine records

912

[Update] [Activate] [Split] [Delete] [Cancel]
  902      904       906    908      910

*Fig. 9*

Default Profile Attributes — 1000

The following values will be the default for all Profile Splits.
You will have an option to change them later

| Preparer | Smith, Joe |
| Final Reviewer | Jones, Sue |
| Dual Review Indicator | ☑ |
| First Reviewer | Tran, David |
| Item Type | |
| Reconciliation Description | |

[Next] [Cancel]

1002

Adding Profile Attributes — 1004

Item 1-9 of 9        Show   Refresh

| Select | Attribute |
|---|---|
| ☐ | Budget Center |
| ☐ | Channel |
| ☐ | Expense Allocation |
| ☐ | Ledger Type |
| ☐ | Product |
| ☐ | Reinsurance Type |
| ☐ | Statutory Line |
| ☐ | Sub Account |
| ☐ | Sub-Product |

[Add] [Cancel]

ARCHITECTURE FOR ACCOUNT RECONCILIATION

TECHNICAL FIELD

The invention relates to system architectures and processes for reconciling financial accounts.

BACKGROUND

Account reconciliation concerns a process for reconciling balance discrepancies that exist between amounts recorded in an account and the original transaction amounts on which the account records are based. One common form of account reconciliation is found in the area of personal finance. Almost everyone is familiar with reconciling his/her personal checkbook with the monthly statement received from the bank. The person examines the check stub or copy of the actual check as written (i.e., the source information) against the bank statement (i.e., the account entry) for any differences. When a discrepancy is found, the person can contact the bank to resolve or reconcile the difference.

While account reconciliation might appear rather basic in the context of personal finance, the practice becomes more involved when applied to corporations or other entities that make thousands of entries per month. Even more complex is the practice of account reconciliation for large multinational corporations having numerous divisions and business units located around the globe to sell many products and services worldwide. It is not uncommon for such multinational corporations to have tens of thousands of account entries per month. Account reconciliation at this level involves more sophisticated issues, such as handling multiple currencies and accommodating different regional and/or national accounting rules and regulations. Moreover, the accounting personnel tasked with transaction entry and account reconciliation (e.g., those who make the original entry, perform any subsequent account reconciliation, review any such reconciliation, and audit the same) are often not physically located in the same department, or even in the same country.

In addition to the inherent complexity of account reconciliation, large corporations operate in a regulatory environment that seeks to ensure accurate and transparent reporting of financial data. There is a renewed premium being placed on accurate financial accounting and reconciliation plays a significant role.

Accordingly, there is continuing need for improved account reconciliation processes.

SUMMARY

An architecture and methodology for reconciling financial accounts are described. The architecture provides a uniform approach for reconciling accounts in a manner that ensures proper controls, both legal and financial, are being met. In the described implementation, the architecture offers a web-based solution that facilitates online account reconciliation in a central and controlled method across many divisions and business units, located within the U.S. or around the world. Various participants can log into the system from anywhere in the world and be directed to the reconciliations for which they are responsible.

The system architecture enables creation and maintenance of reconciliation profiles that define how different accounts are to be reconciled. The system architecture further supports creation of reconciliation documentations, based on the reconciliation profiles, which are used to reconcile individual accounts. Each reconciliation document associates a source amount and a general ledger amount pertaining to an account, and provides one or more reconciliation items used to reconcile any balance discrepancies between the source amount and the general ledger amount.

BRIEF DESCRIPTION OF THE CONTENTS

FIG. 6 shows an example user settings page to assign various user settings to participants in the reconciliation process.

FIG. 8 shows an example of a profile creation screen used to create a reconciliation profile.

FIG. 9 shows an example of a profile screen after the reconciliation profile is created.

FIG. 10 shows an example of a default profile attribute screen that is depicted when the profile creator splits a profile.

FIG. 15 shows an example of a new reconciliation item screen used to add reconciliation items to the reconciliation document.

FIG. 16 shows an example of a reconciliation review screen used to review a reconciliation document.

The same reference numbers are used throughout the figures to reference like components or process acts.

DETAILED DESCRIPTION

Figure 1:
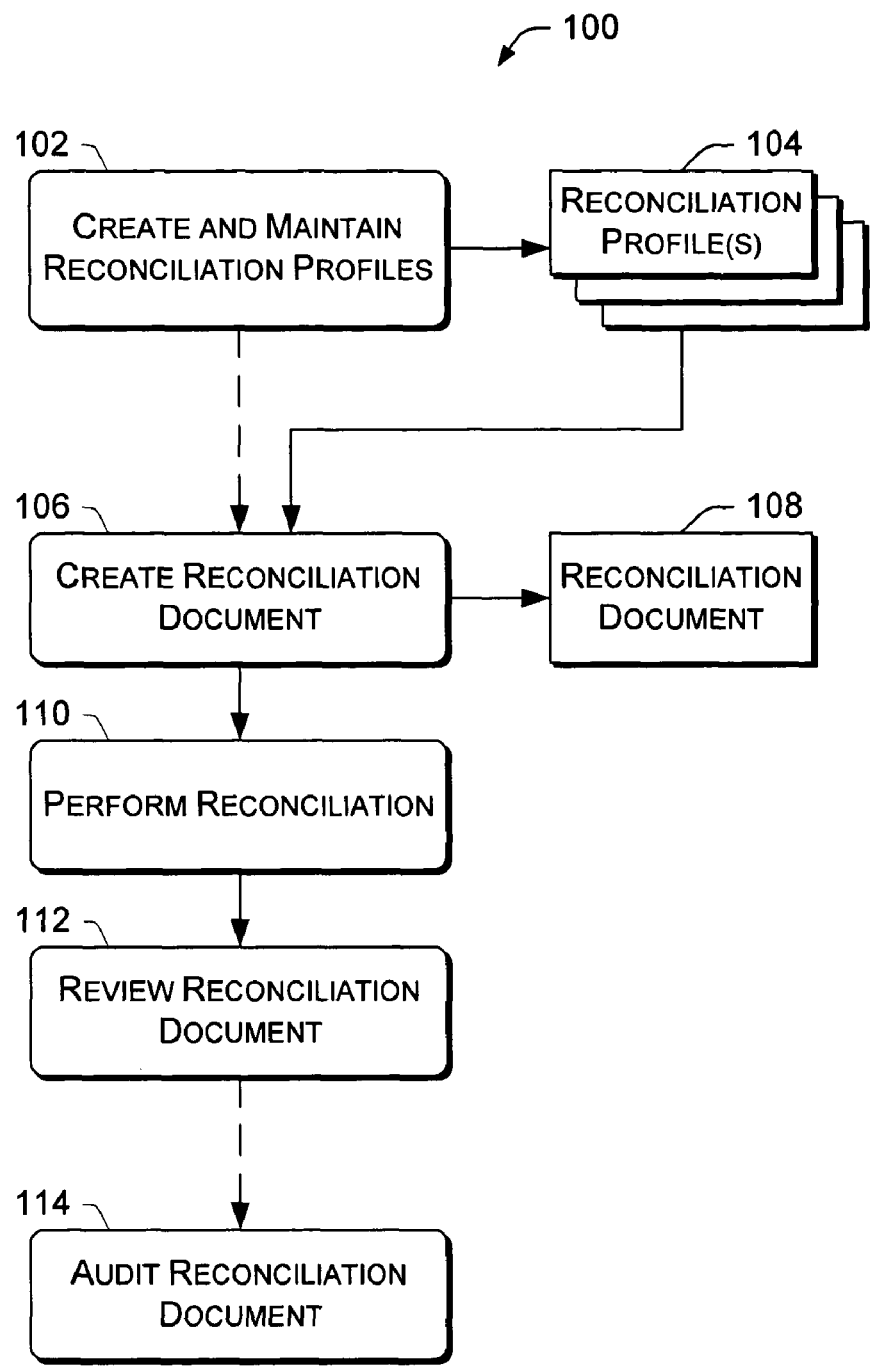
FIG. 1 illustrates a process for reconciling accounts.

The following disclosure describes a system architecture and business processes for reconciling financial accounts. The architecture supports reconciliations from any industry and is customizable at the client level to enable individual businesses, units, or legal entities to specify how it wants to reconcile accounts. The architecture and business processes perform and store account reconciliations online, including all supporting source documentation. Participants in the account reconciliation process receive notification of accounts to prepare or review. Ad-hoc reports can then be generated as needed to help participants manage time, track the progress of account reconciliations from start to finish, and generate management reporting related to account reconciliations to ensure that proper controllership is maintained at each step of the way.

The system architecture and business processes will be described in the context of a particular business (namely, an insurance business) to assist in describing various facets of the invention. However, the architecture and business processes may be implemented in other environments, such as for other types of businesses, non-profit entities, governmental agencies, and so forth. Indeed, the architecture and business processes may be used in essentially any environment involving account reconciliation.

For purposes of continuing discussion, there are two primary inputs to the account reconciliation process: a general ledger and a source. The general ledger refers to a financial record maintained for financial and accounting purposes. The general ledger typically includes an income statement and a balance sheet. The reconciliation process generally concerns accounts on the balance sheet. The second input, or source, refers to the actual data from a transaction for which an entry is made in the general ledger. One example of a source is a sub-ledger maintained in a different transactional system. This system generally aggregates individual transactions and posts summaries to the ledger on a routine basis (e.g., daily, weekly, monthly). The total per sub-ledger provides a source value to be compared with the total per the ledger. Other examples of source data include purchase orders, contracts, sales receipts, and other documents used in the course of business that impact financial accounting.

The business processes described herein can be designed to achieve a specific set of goals. One example set of goals include:
 Ability to document the account description and purpose.
 Enable balancing of reconciliations.
 Provide source documentation independent of the general ledger.
 Make account reconciliation and supporting documentation accessible.
 Resolve open items in a timely manner.
 Ensure review of account reconciliation.
 Complete account reconciliation in a timely manner.

The detailed description that follows is organized to first introduce a general overview of the account reconciliation process and then provide a description of an exemplary implementation of the system architecture. Following this general overview, specific processes and implementation details are described.

General Account Reconciliation Process

FIG. 1 shows a process 100 for reconciling financial accounts. The process 100 is represented as a series of blocks with instructions or descriptions outlining various acts or operations being performed. The operations can be implemented, in part, by one or more computing systems that automate procedures for accounting personnel. Other processes described in this specification will also be illustrated in this way.

At block 102, reconciliation profiles 104 are created and maintained. A reconciliation profile 104 defines how an account or group of accounts will be reconciled. The profile includes various attributes related to the reconciliation, such as identifiers, participant names, relevant business entities, and so forth. The profile can be thought of as a template that defines the reconciliation for a given set of business parameters. The reconciliation profile defines how a reconciliation document is to be created, whereby this document is then used to perform the actual reconciliation. The profile acts as a control point for what gets reconciled, who can reconcile it, and how and who reviews the reconciliation.

The reconciliation profile can be created by individuals who are responsible for the account and/or individuals who are responsible for the reconciliation process. For example, a profile may be partially created by a "coordinator" who is responsible for maintaining account profiles and user profiles for their part of the business. A "preparer" tasked with performing the reconciliation might then be asked to complete the partially-created profile. The reconciliation profile setup is driven by the general ledger setup.

The reconciliation profile 104 is defined once and used many times. The reconciliation profiles can be prepared in advance of the account reconciliation and then stored in a database for easy retrieval. There can be any number of reconciliation profiles, with example numbers for large companies ranging in the tens of thousands of profiles. The reconciliation profiles are uniquely identified by a set of descriptors, such as site location, legal entity, and account identifiers. For further reference, additional user defined fields may be added to uniquely identify each profile.

At block 106, a reconciliation document 108 is created to facilitate reconciliation of an account. The reconciliation document contains information to resolve balance discrepancies between a source balance and a general ledger balance. Actual detection of the discrepancy is handled through conventional techniques, such as human review and software solutions designed to automatically identify when accounts are out of balance. One example of such software is the T-Recs® reconciliation software from Chesapeake System Solutions, Inc. The reconciliation document 108 is designed to capture all information used to reconcile the detected difference within a reconciliation period. The reconciliation period is a predefined period in which the accounts are customarily opened and closed as prescribed by recognized accounting standards, such as the Generally Accepted Accounting Principles (GAAP). One suitable period is monthly.

The reconciliation document is based on a reconciliation profile 104 and is created when a period is opened. The preparer is responsible for creating the reconciliation document. The preparer collects source data (e.g., document images and files showing one or more transactions, plus summaries of these transactions) and ledger data, and then prepares one or more reconciliation items used to reconcile any differences between the ledger and source data. More specifically, a reconciliation item is an explanation of the difference between the general ledger balance and the source balance. There are two types: an open item and a timing item. An open item is an item that involves taking specific action to adjust either the source or general ledger balance. A timing item is a temporary difference that will automatically resolve over time (e.g., a check in transit). Each reconciliation item has a corresponding adjustment amount. Other information contained in the reconciliation item may include creation date, transaction date, description of item, business-specific root causes for the item, action owner, currency, target resolve date, actual resolve date, action plan for resolution, item type (i.e., general ledger or source), and general ledger account that is impacted. While editing or viewing the reconciliation document, the preparer can send the action plan, with comments, to a participant tasked with resolving the item. The comments shall be stored and linked to the reconciliation document as a permanent record.

Accordingly, the reconciliation document 108 includes: (1) the underlying reconciliation profile that defines how the account will be reconciled, (2) the period for reconciliation, (3) a general ledger balance, (4) a source balance and accompanying source documentation, (5) reconciliation items with adjustment amounts, and (6) any miscellaneous comments. The reconciliation document 108 can be embodied as an electronic document stored in a database, allowing it to be served upon request. The document may itself contain all of the information, or have links or pointers to parts of the information, such as the source documentation and general ledger data.

At block 110, reconciliation is performed to reconcile the items, making the proper adjustments to the correct account. The reconciliation document remains in draft form until reconciliation is completed. Reconciliation is deemed complete when the general ledger balance plus the reconciliation item adjustments equals the source balance and the reconciliation has been reviewed.

It may also be prudent to evaluate any income statement exposure caused by the reconciliation. Income statement exposure means that there is the possibility that clearing the item could result in a general ledger transaction that would increase or decrease income. Identifying the exposure can be done on the reconciliation document during preparation or at the time of review. If there is an exposure, the maximum expected value can be estimated and entered. Income statement exposure may be indicated at the item level or the overall reconciliation document level.

The reconciliation document can be characterized as reconciled when reconciliation is complete, all open items contain an action plan, resolve date, and action plan owner, and any income statement exposure has been evaluated. There may be an additional qualitative decision point in which the preparer confirms that the reconciliation meets a set of predefined criteria set by company.

At block 112, the reconciliation document is reviewed. One or more reviewers review the reconciliation document to offer an independent verification that the reconciliation document created by the preparer sufficiently describes the differences between the general ledger balance and the source balance. System controls ensure that reviewer(s) are different from the preparer, so that the same person who submitted the reconciliation is not the one to review it. Once approved by the reviewer(s), the reconciliation document can be marked final.

At block 114, the reconciliation document can be subsequently audited. An auditor is given view-only access to review the reconciliation document for purposes of an audit. The auditor may enter comments that become part of the reconciliation document.

The process 100 facilitates a uniform approach for reconciling accounts in a manner that ensures proper controls for both legal and financial considerations are being met. The process can be implemented in many ways. In the following discussion, the process 100 is implemented in a web-based solution that facilitates online account reconciliation. Participants are granted online access to their portions of the reconciliation process, thereby alleviating any need for them to be physically located near one another or near the source and general ledger information. The process scales to support accounts reconciliations at large corporations having many divisions and business units, located throughout the world, with different currency and reporting criteria.

System Architecture

Figure 2:
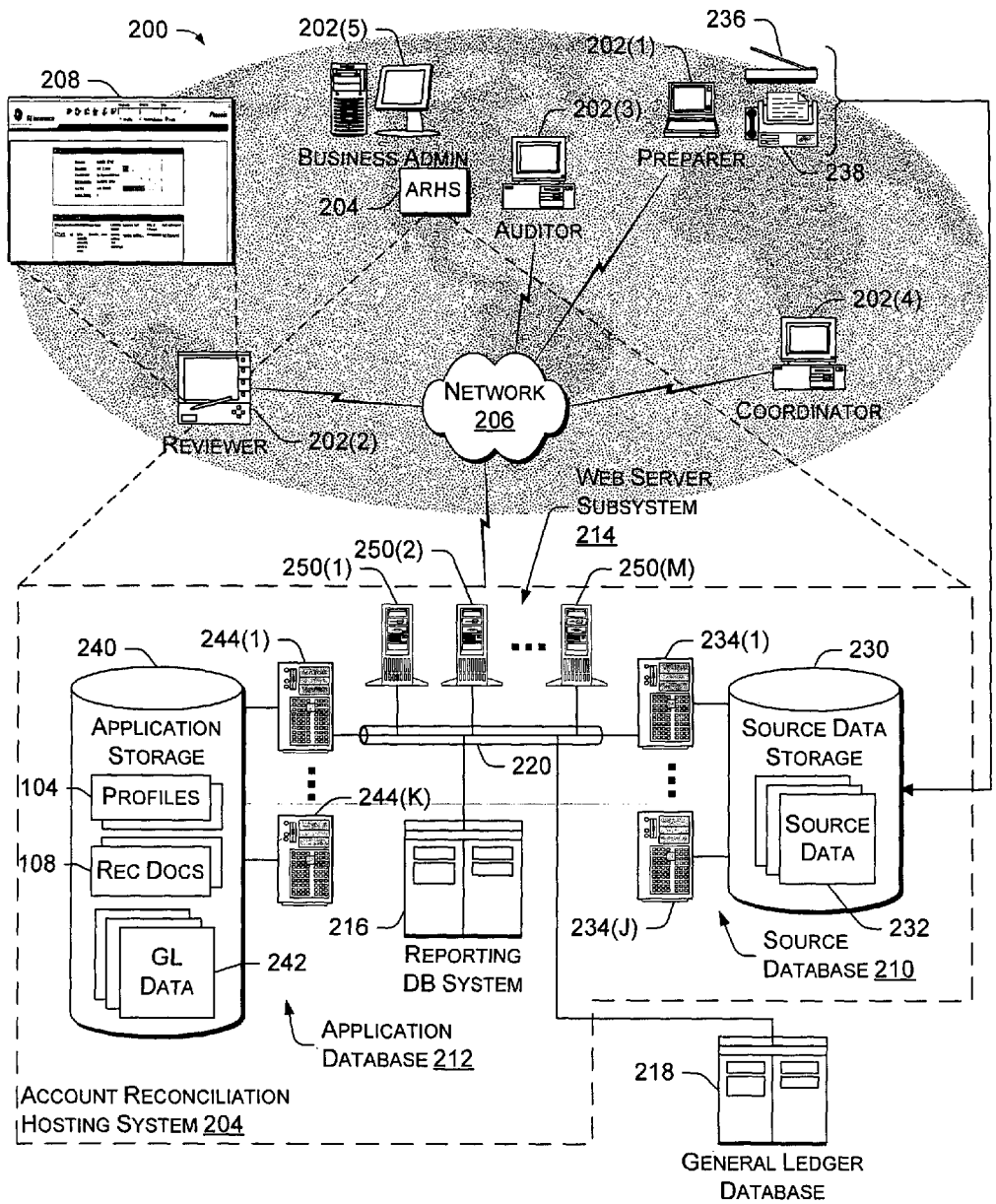
FIG. 2 illustrates an exemplary system architecture for implementing the process of FIG. 1. The system architecture includes multiple client devices hosted by an account reconciliation hosting system.

FIG. 2 shows an exemplary system architecture 200 for reconciling financial accounts. It may be used, for example, to implement the process 100 described above with respect to FIG. 1. The system architecture 200 is described as a distributed computing system that offers a flexible web-based approach to performing and storing account reconciliations online. It collects and stores ledger data, source documents, and any other information used in account reconciliation, and then supplies the information to authorized clients. The system architecture simplifies document creation and handling, as well as improves the account visibility before and after the reconciliation.

System architecture 200 has multiple client devices 202 coupled to an account reconciliation hosting system 204 via a network 206. The client devices are used by participants in the account reconciliation process. The account reconciliation hosting system 204 hosts the account reconciliation services, making them available online to the participant client devices 202 over network 206. The hosting system 204 is capable of receiving requests from the client devices 202 and serving documents and information in reply for use by the participants when reconciling accounts.

The network 206 may be implemented in many different configurations, using many different technologies and communication protocols, to enable data communication among the devices and hosting system regardless of location. For example, the network 206 may be physically configured to use the Internet, one or more wide area networks (WANs), one or more local area networks (LANs), or any combination of such networks. When a public network is involved (e.g., Internet), the network 206 may support creation of virtual private networks (VPNs) or other secure data paths. Additionally, the network 206 may involve use of wireless technologies (e.g., satellite, RF, Wi-Fi, Bluetooth, etc.) and/or wire-based technologies (e.g., cable, fiber optics, DSL, etc.) and any number of various network protocols (e.g., TCP/IP, NFS, etc.).

Five client devices 202(1)-202(5) are shown to represent the five different roles performed by participants in the account reconciliation process. The devices may be implemented in any number of ways, including as a work station computer, a general-purpose computer, a laptop computer, a handheld computing device, a personal digital assistant (PDA), a tablet computer, a communications device (e.g., cellular phone), and so on. One example of a client device is described below with respect to FIG. 3.

The participants may reside in different locations, but are able to participate in the online reconciliation process by logging onto the services supported by the hosting system 204 using the client devices 202. The hosting server 204 may be configured to validate the user and evaluate his/her security clearance to determine a level of access to the system. The hosting server 204 may also establish a secure channel with the client device 202 to ensure confidential communication.

For illustration purposes, a preparer located in Geneva, Switzerland utilizes a laptop computer 202(1) to access the hosting system 204. Once online, the preparer can submit source documentation and prepare a reconciliation document with reconciliation items for a given account. A reviewer in Sydney, Australia, uses a tablet computer 202(2) to connect to the hosting system 204 and review the reconciliation document after it is prepared by the Swiss-based preparer. An auditor in Washington, D.C., uses a desktop computer 202(3) to access and audit the reconciliation document. A coordinator in South Africa employs a personal computer 202(4) to maintain account profiles and user profiles. A business administrator in Kansas City uses a work station 202(5) to manage the system architecture, including the hosting system 204. The business administrator has overall responsibility for the system configuration and execution, as well as establishing user and security settings, monitoring exception reports, and maintaining profiles. In to the participants represented in FIG. 2, a CFO might also be involved in the review, such as reviewing a summarized status of reconciliations to determine the accuracy of the financial statements (e.g., how many unreconciled accounts exist, size of any potential P&L exposure, etc.).

Each client device 202 executes a browser program to access, retrieve, and present the account reconciliation information. Information is served from the account reconciliation hosting system 204 in the form of web pages and depicted on the client device via the browser in a familiar, easy-to-understand graphical user interface (GUI). An example home page 208 is illustrated as appearing on the display of the table computer 202(2). The web pages may be written in a mark up language, such as HTML. The home page 208, and other pages and screen interfaces, are described below in more detail.

The account reconciliation hosting system 204 is comprised of servers and databases that host the online account reconciliation services. The hosting system 204 includes a source database 210, an application database 212, an application server subsystem 214, and a reporting database 216. These computing subsystems are illustrated as being connected by a network 220 (e.g., Ethernet), although more than one network may be involved. The hosting system 204 is also connected via network 220 (or another separate network) to a general ledger database 218.

The source database 210 is configured to collect, store, manage, and serve source data used in the reconciliation process. The source database 210 includes a source data storage 230 to store source data 232 and a set of one or more database servers 234(1), . . . , 234(J) coupled to access, retrieve, and serve the source data 232. In one implementation, the servers 234(1)-234(J) run a document imaging system (e.g., FileNet® image manger from FileNet Corporation of Costa Mesa, Calif.) to provide the source data 232 on demand to the application database 212.

The source data 232 is entered into the source database 210 by submitting source documentation used to evidence a particular transaction. The source documents are introduced in such a way that participants can annotate and highlight various portions of the documentation, but are prevented from altering it. Submission of source documentation may be handled in many ways, including by recording the availability and location of hardcopies, uploading an electronic file to the hosting system 204, and/or inducting digital images of the documents into the hosting system. In the FIG. 2 illustration, for example, the Swiss-based preparer may physically file the documents in a European office and record an identity and location of the documents for future reference. The preparer may alternatively upload a file to the source database 210 or employ an imaging device, such as scanner 236 or a facsimile machine 238, to induct images of the source documentation into the system architecture. In the case of the facsimile, the preparer faxes the hardcopy document to a pre-specified number. The document image may be immediately assigned as a source document, or temporarily held in a holding pool to be assigned at a later time. Once assigned as a source document, a barcode is added to the first page of the document image and used to route the document image to the source database 210, where it is filed in the source data storage 230. The document images can be permanently preserved in memory (e.g., burned into an optical disc). The document images may be retained in the storage 230 and/or subsequently transferred to an off site storage location.

Each source document can represent either a single amount or multiple amounts. For multiple amounts, multiple records are created in the source data storage 230, one for each associated amount. Additionally, source documents are generally created and associated with one related reconciliation document for a particular reporting period. The system architecture can be configured, however, to allow participants to reference a source document from a previous reporting period for use in the current reporting period. Further, the system architecture permits a participant to share a single source document across multiple reconciliation documents of the same reporting period.

The general ledger database 218 houses original general ledger data to be used in the account reconciliation process. The general ledger database 218 can be the legacy database that the business currently uses to maintain its ledger account data, or a separate redundant database that mirrors the legacy database. The general ledger database 218 may be implemented, for example, using conventional business applications available from Oracle Corporation or SAP. The general ledger database 218 may be configured to push the general ledger data to the hosting system 204, or alternatively, the hosting system 204 may be configured to pull the data from the general ledger database 218. It is noted that, although only one ledger database is shown, there may be multiple ledger databases feeding different types of ledger data to the account reconciliation hosting system 204. The hosting system 204 is capable of reconciling items for multiple ledgers.

The application database 212 hosts an account reconciliation application that facilitates the online account reconciliation process. The application database 212 includes application data storage 240 to store the reconciliation profiles 104, the reconciliation documents 108, and one or more sets of general ledger data 242 from ledger databases, such as database 218. The storage 240 also contains data structures and other data or information used by the account reconciliation application. The application database 212 also has a set of one or more database servers 244(1), . . . , 244(K) to run the account reconciliation application, enabling participants to create and save reconciliation profiles 104 and documents 108, add reconciliation items to the documents, reconcile the items, and review and audit the reconciliation. The servers 244 are coupled to access, retrieve, and serve the profiles and reconciliation documents stored in the application data storage 240. The application servers 244, when executing the account reconciliation application, provide for reconciliation of the general ledger data 242 with the source data 232. The reconciliation may involve one or more source documents for corresponding one or more general ledger accounts. For example, one or more source documents may be used to reconcile a single general ledger account.

The web server subsystem 214 that receives requests from client devices 202, collects requested information from the various databases, and then serves the information back to the devices 202. In one implementation, the web server subsystem 214 has a set of one or more web servers 250(1), 250(2), . . . , 250(K) that serve web pages generated using server page technology, such as Java Server Page (JSP) from Sun Microsystems or Active Server Page (ASP) from Microsoft Corporation.

The reporting database 216 enables generation of reports on the account reconciliation process. The reporting database system runs OLAP (OnLine Analytical Processing) decision support software to summarize information into multidimensional views and hierarchies and then perform various analyses on the information. For example, OLAP tools can be used to perform trend analysis on financial information. Such tools allow participants to drill down into specific accounts and transactions.

It is noted that the source database 210, the application database 212, and the web server subsystem 214 are illustrated with multiple servers to demonstrate the scalability of the architecture. For smaller businesses, perhaps only one server can be used in each subsystem. For larger business, multiple servers are employed. In this scenario, each server runs an instance of the functional software and load balancing is performed across the multiple servers to provide a more efficient and even distribution of request processing across the servers. The servers might also provide redundancy to avoid failures in an individual server.

It is further noted that the hosting system 204 is capable of hosting the account reconciliation process in multiple languages. Pages can be served in different languages to support the various participants located throughout the world. The reviewer in Switzerland might view pages in German or French, while the reviewer in Australia views pages in English.

Figure 3:
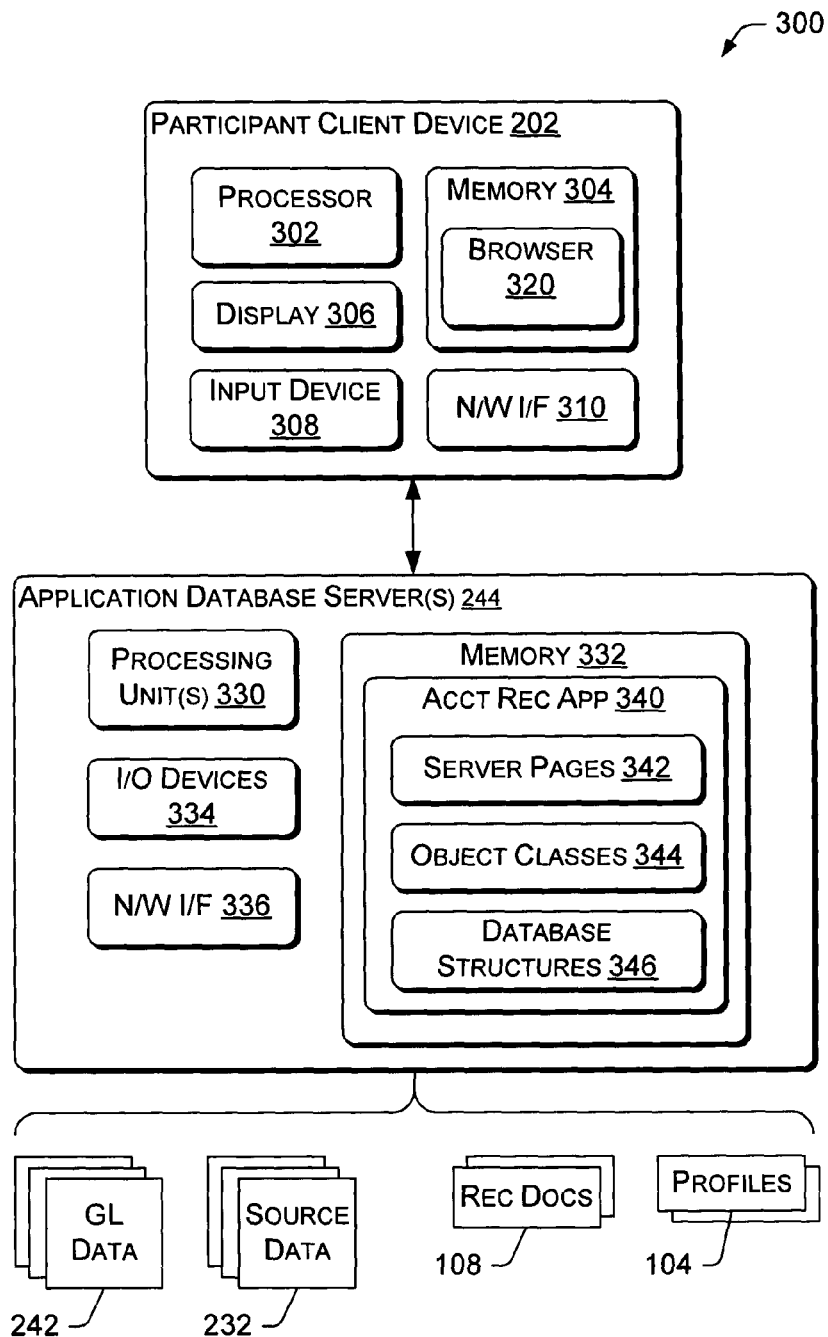
FIG. 3 is a functional block diagram of an individual client device in communication with an application database server resident in the account reconciliation hosting system of FIG. 2.

FIG. 3 depicts a more functional representation of an individual client device 202 in communication with the application database server 244 resident in the account reconciliation hosting system 204. The web server subsystem is not depicted in this illustration for simplicity purposes. The client device 202 includes a processor 302 and memory 304, including volatile memory (e.g., RAM) and non-volatile memory (e.g., ROM-based memory, disk memory, etc.). The client device 202 is equipped with a display 306 (e.g., monitor, LCD, etc.), one or more input devices 308 (e.g., keyboard, mouse, touch-sensitive panel, microphone, etc.), and a network interface 310 to facilitate connectivity over one or more networks. The various components may be interconnected via one or more system buses (not shown).

The client device 202 can be configured to store and run programs. A browser program 320 is shown stored in client memory 304 and is executed on the processor 302. The client device 202 may also implement an operating system (not shown).

The application database server 244 is implemented as a distributed computing system, but logically includes one or more processing unit(s) 330, memory 332 (e.g., memory in database servers and data storage memory), I/O device(s) 334, and one or more network interfaces 336. An account reconciliation application 340 is illustrated as being stored in memory 332. When it is executing on processing unit(s) 330, the account reconciliation application 340 assists participants in progressing through the various phases of the account reconciliation process 100 (FIG. 1), including creating profiles and reconciliation documents, performing the reconciliation, reviewing the reconciliation document, and auditing the reconciliation document.

The account reconciliation program 340 includes a set of server pages 342 used to generate the web pages served to client device 202. The server pages may be implemented, for example, using Java Server Page (JSP) technology from Sun Microsystems. The pages 342 perform function calls to a set of object classes 344 to form and populate the web pages with information stored at the hosting system 204. The object classes may be implemented, for example, using Java class technology or other object-oriented programming technology. The account reconciliation program 340 can be configured to generate pages drafted in multiple languages to support participants with different native languages and to exhibit monetary amounts in different currencies.

Account reconciliation program 340 also includes database structures 346 to organize the data. For instance, the information can be organized into database tables arranged in a collection of classes and associations among the classes.

The database structures 346 may further impose a schema that ensures that the data is represented in a particular manner. In this way, the application 340 can validate data and data types being entered by the participants. For example, if the user is asked to provide an account, the application shall either provide valid values in a drop down list or validate the user's input with a list of the valid values before they are accepted.

The account reconciliation application 340 allows the preparer to reconcile differences found in the general ledger balances and source balances. The application 350 enables the preparer to create a reconciliation document 108 from a profile 104 and extract information from source data 232 and GL data 242 to form the reconciliation items. The application generates pages that show the differences, facilitates entry of adjustments to reconcile the differences, and provides links to supporting documentation for verification and review. An exemplary set of pages used to aid a participant in the reconciliation process is described next.

Application User Interface

Participants initially log into the account reconciliation hosting system 204 by entering a user ID and a password into a logon page. Upon logging in, each participant is taken to a home page that is customized for them. A single logon can be employed to allow access to the home page, which then provides a gateway to the various reconciliation functions.

Figures 4, 5:
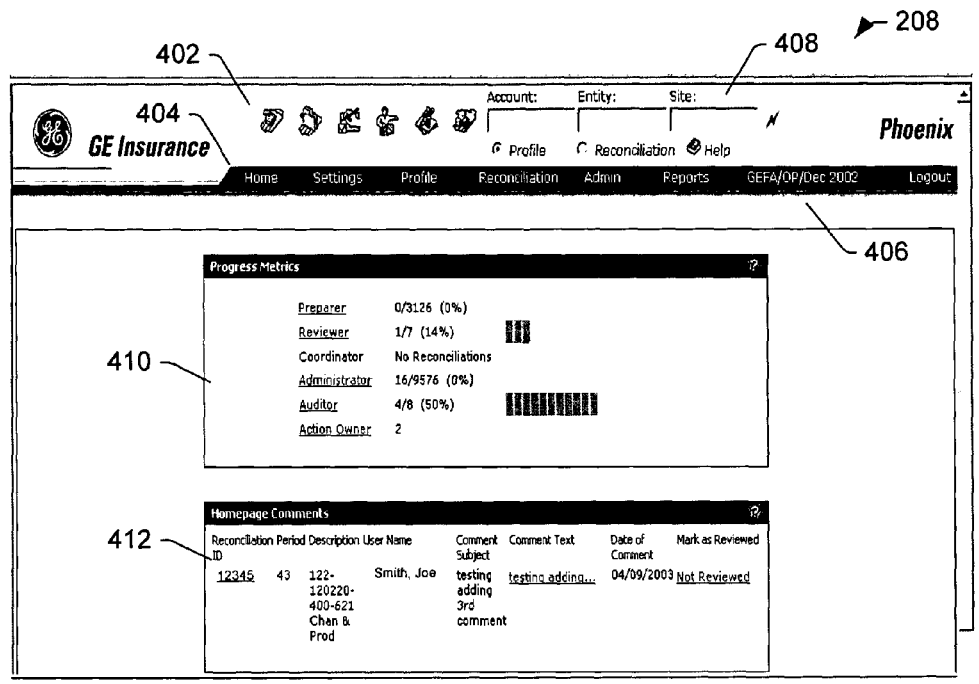
FIG. 4 illustrates an exemplary home page served when a user first accesses the account reconciliation hosting system.
FIG. 5 shows an example results screen depicted in response to a search of reconciliation profiles and/or reconciliation documents.

FIG. 4 shows one exemplary home page 208 that is depicted on the participant client device 202 after the participant logs into the account reconciliation hosting system 204. This particular home page 208 is customized for an insurance business for GE Corporation, as represented by the GE logo and associated name "GE Insurance." The home page 208 organizes reconciliations, displays metrics information, and messages from other users. From this page, the participant can navigate to the other modules in the application, change certain application settings, and obtain real time updates on the status of the account reconciliations.

The home page 208 includes a set of one or more hot keys 402 that are selectively made available to various participants depending upon their roles (i.e., preparers, reviewers, etc.) and security profile. Activating a hot key 402 leads the participant directly to the selected item in the system. In this example, the hot keys 402 include keys for accessing business administrator profiles, coordinator profiles, reviewer profiles, preparer profiles, owner profiles, and a list of open outstanding reconciliation items associated with the user.

FIG. 5 shows an example results screen 500 that is depicted in response to a search. In this case, the results screen 500 shows the results retrieved following activation of the "preparer profiles" hot key for a fictitious preparer named "Joe Smith." He currently has one profile. The results screen 500 shows the profile code, profile description, legal entity, profile status, reconciliation definition, preparer identity, reviewer identity, and owner identity. The listed profile code 502 is itself a link that, when activated, takes the participant directly to the profile.

Returning to FIG. 4, the home page 208 further includes a menu bar 404 with various navigation links, such as "home", "settings", "profile", "reconciliation", "admin", "reports", and "logout". Hovering a pointer over a menu bar link invokes a drop down menu with a list of detailed options associated with the link. The "home" link takes the participant from any current page back to this home page 208. The "settings" link opens a user settings page.

Figures 6, 8:
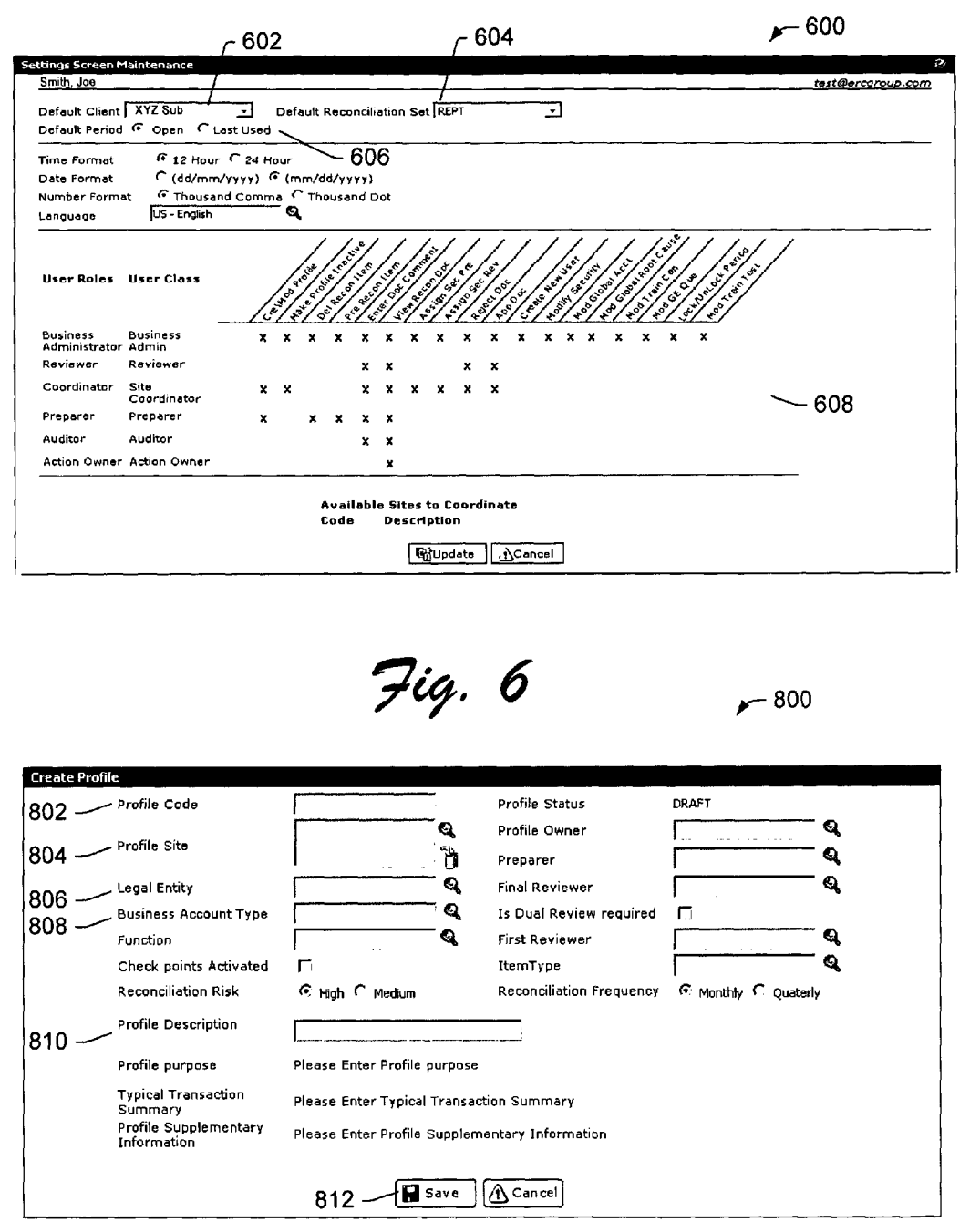

FIG. 6 shows an example user settings page 600. The settings are specific to each participant and are applied when the application is first opened. The settings can be changed at any time through this page. The settings page 600 includes a default client field 602 that enables the participant to specify the client to which the application will default when the account reconciliation application is first opened. A default reconciliation set field 604 allows the participant to specify a default reconciliation set and a default period field enables specification of a default period. The user settings page 600 further allows the participant to select the time format, date format, number format, and language.

The lower portion 608 of the user settings page 600 is for information purposes. Portion 608 indicates the roles that have been assigned to the participant. It also identifies the participant's security and access rights to various locations and information in the system. Security settings cannot be changed from this screen.

Once again returning to FIG. 4, the menu bar 404 also has a "profile" link to guide the participant to one or more pages that allow a participant to create a profile from scratch, or by copying an existing profile, and for performing advanced searches for profiles. A "reconciliation" link navigates the participant to one or more pages for reconciliation operations, including an advanced search page for searching reconciliation documents.

The "admin" link jumps the participant to pages associated with system settings and maintenance. This is mostly reserved for the business administrators and application administrators. The "reports" link allows the participant to produce various reports, including a report showing all accounts with balances that are not assigned to profiles, a report showing all accounts with balances that have changed since the user last logged into the system, and a report showing the participant his/her status in the previous, current and next periods. The "reports" link also allows the participant to extract a population of accounts from the database and upload a sample of accounts to audit. A "logout" link enables the participant to log out of the system.

Located on the right side of the menu 404 is a point-of-view section 406 that tells the application certain information about how the participant may want to work in the application. It contains default information for many of the searches and reports generated by the application. Clicking on the point-of-view section 406 brings up a screen that informs the user of what client he/she is currently working on, the reconciliation set, and the reconciliation period. A participant can optionally change these settings. The section 406 also enables the participant to move between clients, periods, or reconciliation sets. The difference between the point-of-view section 406 and the user settings page 600 is that the user settings are applied when the application is first opened. The point-of-view section 406 is used to change activity once the participant is already in the application. For instance, if a participant likes to see a cash reconciliation set when he/she first logs on, the user settings specify cash as the default reconciliation set. Once in the application and the participant wants to switch to the GAAP reconciliation set, the participant can use the point-of-view section 406 to make the change.

A quick search section 408 allows a participant to quickly enter any of the relevant criteria to bring up a list of reconciliation profiles or reconciliation documents that match the criteria. In this example, there are fields for user entry of an account identifier, an entity name, or a site identifier. The participant can further specify whether searches are for profiles or reconciliation documents. The results of the search are presented in the results screen 500 of FIG. 5. The quick search section 408 includes a help feature to invoke a list of help topics.

In addition to the quick search section 408, it is also possible to search for profiles or reconciliation documents based on other criteria contained within the profile. A more advanced search screen (not shown) allows the participant to specify such additional search criteria as the profile code assigned to the profile, a profile description, legal entity, final reviewer, preparer, first reviewer, corporate account type, business account type, last change date, reconciliation frequency, reconciliation risk, chart of accounts, checkpoints, profile status, function, and split attributes.

The home page 208 further includes a progress metrics area 410 that presents the statuses of various participants in completing their tasks for a selected period. The metrics area 410 provides numeric values (e.g., the number complete out of the number currently assigned), percentages (e.g., percent complete out of the number currently assigned), and graphical completion bars that change in appearance as tasks are performed to give a participant a quick summary of what has been accomplished. In this example, the reviewer has reviewed one of seven (14%) reconciliation documents, which is graphically depicted by three different colored segments of the completion bar. The participant roles can themselves be links so that activating any one of the roles brings up a list of profiles that are currently outstanding, thereby alleviating the need to search for them.

A comments area 412 is situated beneath the progress metrics area 410 to show messages or other information. The participant can receive information specific to his or her responsibilities, including comments regarding approved or rejected reconciliations or information regarding items that have been cleared or have been assigned to him or her. Clicking on a comment link will open the comment and allow the participant to read the entire comment.

Reconciliation Profile

Figure 7:
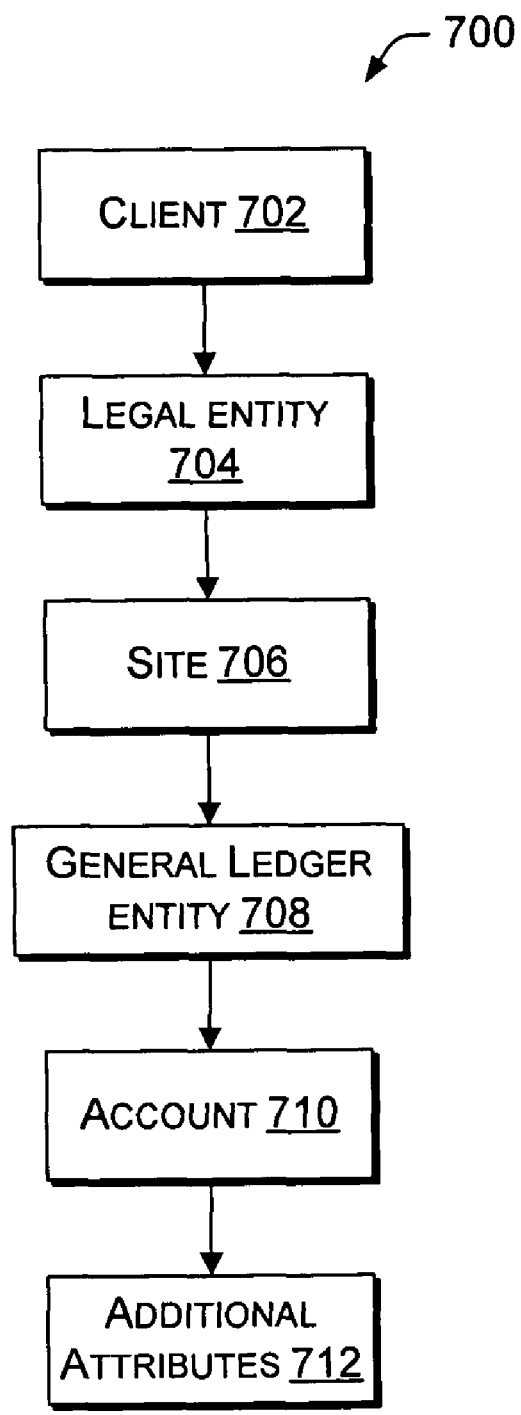
FIG. 7 illustrates an account hierarchy to demonstrate how accounts can be organized within the system architecture.

Reconciliation profiles define how an account or group of accounts will be reconciled. Accounts can be generally organized according to a hierarchy 700 shown in FIG. 7. At the highest level of organization, all accounts are created for a particular client (level 702), such as a corporation. Accounts can then be organized according to particular legal entity within the client (level 704). Accounts may further be organized within each legal entity according to a site location (level 706) where the transactions are processed. Accounts may additionally (or alternatively) be arranged according to general ledger (G/L) entities (level 708), which are businesses that exist underneath the legal entities and may or may not be assigned to a single site. The account level 710 is next in the hierarchy, and each account may be defined with additional attributes of accounting transactions (level 712), permitting organization of accounts according to sub-accounts, distribution channels, products, and the like.

Profiles are created for a particular account of a particular legal entity at a particular site (i.e., a site/entity/natural account combination). Profiles are created using a profile creation page, to which the participant can navigate from the home page 208 of FIG. 4.

FIG. 8 shows one example of a profile creation screen 800. It allows a participant who has been given authorization by a business manager to create a profile for a particular account. The profile creation screen 800 includes entry fields for profile code ID 802, profile site 804, legal entity 806, business account type 808, and profile description 810. Table 1 lists the fields in profile creation screen 800, along with a description of the fields.

TABLE 1

Fields in Profile Creation Screen 800

| Field Name | Description |
| --- | --- |
| Profile Code | Identifying code of the reconciliation profile; it is used to distinguish the profile from other profiles |
| Profile Status | Specifies status of the profile; upon creation, a profile is given a status of "DRAFT"; when completed, the profile's status is changed to "ACTIVE" |
| Profile Site | Name(s) of site(s) that are included in this profile |
| Legal Entity | Identity of legal entity for the profile |
| Business Account Type | Type of account(s) being assigned to profile |
| Function | Identifies who is responsible for the account |
| Checkpoints Activated | Checkpoints are used to track the status of a profile on a routine basis; if turned on, the system will expect for the profile to be reconciled and reviewed on a routine basis |
| Frequency | Defines how often reconciliation is to occur for the account; in this example, available options are "Monthly" or "Quarterly" |
| Profile Owner | Identifies person who is responsible for the reconciliation profile |
| Preparer | Identifies person who is responsible for reconciling the account |
| Final Reviewer | Identifies person who is responsible for reviewing the account |
| Dual Review Required | If checked, the profile will require two reviewers: a first reviewer and the final reviewer |
| First Reviewer | Identifies person who is responsible for performing the first review of the account |
| Item Type | Type of item that is most likely to be found in this account |
| Profile Description | Brief description of the reconciliation profile |
| Profile Purpose | Purpose of the account(s) assigned to the reconciliation profile |
| Typical Transaction Summary | Description of a typical transactions that generally flow through the account |
| Profile Supplementary Information | Information that is discovered while reconciling the account that may help people reconcile in the future |

Once the participant fills in the fields in the profile creation screen, he/she can click on the save option 812 to save the profile. The profile is stored in the application storage 240. If the profile saves successfully, the participant is returned to a profile screen.

FIG. 9 shows an example of a profile screen 900. It is very similar to the profile create screen 800, but further includes information filled into the fields. The profile screen 900 also includes an additional a set of control buttons, including an "update" button 902 that allows a participant to save any changes made to the profile, an "activate" button 904 to activate the profile once created, a "split" button 906 to add splits to the profile, a "delete" button 908 to delete the profile and revert to draft status, and a "cancel" button 910 to return the participant to the home page.

The profile screen 900 further includes a profile line 912 to list accounts according to the account identifier and GL entity. Once the profile is created, the participant can include as many accounts in a profile as desired, as long as they belong to the same legal entity. That is, the participant may assign multiple sites or multiple accounts to a single profile, but cannot include accounts from multiple entities.

The system also facilitates flexibility in defining such profiles. As noted above, the profile is generally defined at the account level and grouped by legal entity. However, this may not be how all accounts are reconciled. Some accounts, due to various business reasons, might be reconciled at a level of detail that is greater than is provided at the standard profile level. To accommodate this situation, the system allows the profile creator to perform a "split" by selecting the "split" button 906. This action invokes another screen to add more criteria. The application takes the balance identified at the standard profile level and "splits" it by the additional fields so that the account can be reconciled at a higher level of detail. Different reconcilers and reviewers can be assigned to each split criteria or one person can be assigned to reconcile all of the splits. If the sum of the split balances does not equal the total profile balance, the application forces reconciliation of the remaining profile balance. In order for the profile to be considered reconciled, all split assignments and residual profile balances must be reconciled. Splits apply to the entire definition created at the profile level.

FIG. 10 shows an example of a default profile attribute screen 1000 that is depicted when the profile creator splits a profile. The profile creator is asked to assign default values. Most of the defaults will be assumed from the profile and applied to the splits, but the profile creator has the option of changing the defaults. The fields on the default profile attribute screen 1000 have the same meaning as on previous screens, but are applied to the split reconciliations and not to the overall profile. When the profile creator clicks the "Next" button 1002, a profile attributes screen 1004 is presented to allow the profile creator to add additional attributes defining the split profile. The profile attributes screen 1004 corresponds to the account segments that appear in the ledger. In this example, there are nine attributes including budget center, channel, expense allocation, ledger type, product, reinsurance type, statutory line, sub account, and sub product. The profile creator can select one of the attributes on which to split the profile. It is possible to split on more than one attribute.

Once profiles are defined, they are maintained. The profiles are stored at the application database 214. The business administrator is partially responsible for the maintenance of the profiles. The business administrator is additionally responsible for maintaining the account reconciliation application 340. A set of maintenance screens (not shown) allow the business administrator or other person tasked with the responsibility to manage various maintenance areas, including:

Client Reconciliation Set—defines system settings for each reconciliation set for each client.

Item Type—defines classes of reconciliation items that are available in the system. Item Types are high level categories and more specific sub-categories can be created using Item Type Attributes.

Item Type Attributes—allows further definition of item types to support reporting on a more detailed level. For instance, if an item type is defined as "timing", an Item Type Attribute might be "Check in the Mail" to segregate out items in this criteria.

Root Cause—provides reasons that the items exist as well as how the item will be carried in the system (as an open item or a timing item). The root cause maintenance screen allows the administrator to set up a standard list of root causes so that reporting is consistent. Each root cause is assigned as either a timing item or an open item.

Action Plan—describes how open items will be corrected.

Corporate Account—defines accounts to be reported on a regular basis (e.g., quarterly). A corporate account maintenance screen is used to maintain the list of corporate account types (i.e., cash, investments etc.)

Business Account—defines accounts at the business level, and can be mapped to corporate accounts. A business account maintenance screen allows the administrator to define business specific account types that may further define accounts based on a business need.

Client Maintenance—maintains a list of active clients in the system.

Source General Ledger System Maintenance—allows administrator to define general ledger sources.

Site Maintenance—defines all active sites within the system and keeps track of the site coordinator so that new accounts coming into the system are assigned to the correct person at the site level. Assigning site access precludes the participant from seeing any information pertaining to another site.

Site Access Maintenance—used to assign coordinators to sites.

Legal Entity Maintenance—defines all active legal entities within the system and keeps track of the legal entity coordinator so that new accounts coming into the system are assigned to the correct person at the legal entity level.

Legal Entity Access Maintenance—used to assign the legal entity coordinators to their respective companies.

User Class—provides security profiles that end users can be assigned. Each user class has specific security settings. People can be assigned to multiple user classes and each user class pertains to a single client.

User Settings Maintenance—allows administrator to set up new users in the system and define certain information about them.

Currency Maintenance—maintains a list of currencies and their respective codes for the entire application.

Function Maintenance—maintains a list of functions within the system. This allows profiles to be tracked by criteria other than simply site or company.

Location Maintenance—allows the administrator to define certain information about different locations that may be used within the system for each client.

Departments—identifies groups to which a user is assigned (in addition to Location and Function). It is another way of reporting how accounts are reconciled and the status of the reconciliations.

Period Maintenance—allows administrator to set various periods, such as year, month and quarter. Each period has cutoff dates and due dates and can be open or closed in the system, thereby allowing or not allowing reconciliations.

Back Up Users—allows a back up person to be assigned to another system user for a specified amount of time to make it easy to cover temporary changes in staffing.

Test Maintenance—allows the administrator to enter the test and add questions and answers to populate the test.

Reconciliation Document

A reconciliation document is prepared for each reconciliation to be performed. The preparer initially creates the reconciliation document from the reconciliation profile for the appropriate client/site/account. Thus, the reconciliation document contains essentially the same account information and then collects source documentation (e.g., images and files showing transaction) and reconciliation items that will be used in the reconciliation.

Figures 11, 12:
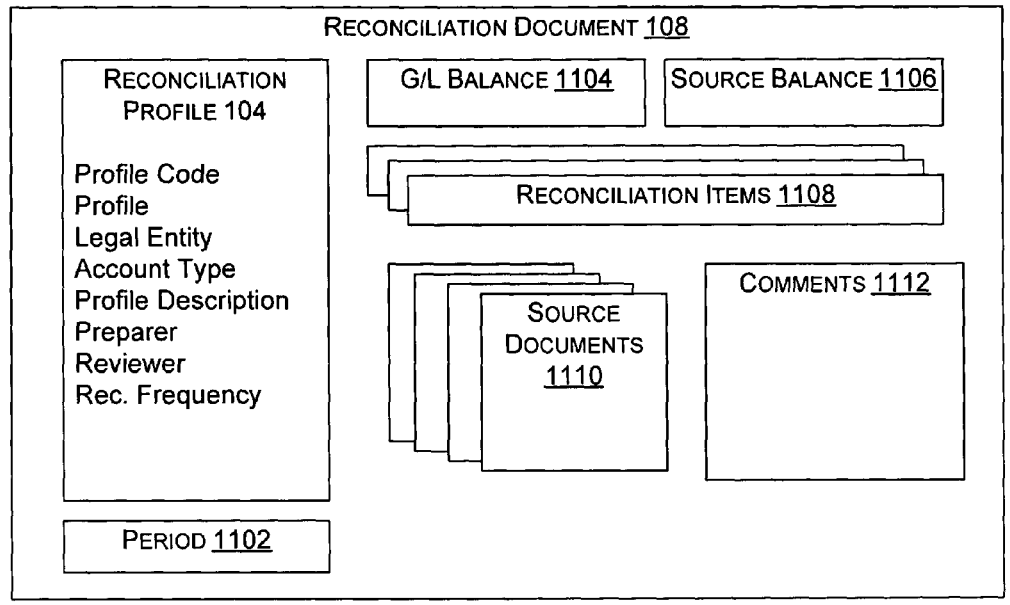
FIG. 11 illustrates a reconciliation document created from the reconciliation profile.
FIG. 12 shows an example of a reconciliation screen used to perform account reconciliation.

FIG. 11 shows a reconciliation document 108. It includes a copy of the reconciliation profile 104 that defines how the account will be reconciled, along with a stated period 1102 for reconciliation. It also includes a general ledger balance 1104, a source balance 1106, and reconciliation items 1108 with adjustment amounts. Source documents 1110 that have been electronically stored in the system are also included in the reconciliation document 108, as are any miscellaneous comments 1112 added by participants in the reconciliation process. The reconciliation document 108 can be embodied as an electronic document stored in a database or other computer-readable media, allowing it to be represented on a computing device. The reconciliation document 108 may incorporate all of the described materials (including source documents 1110) or alternatively provide links or pointers to the relevant portions (e.g., a link to the source documents 1110 and comments 1112).

The reconciliation document 108 has different statuses depending on what has taken place in the reconciliation process. The document 108 is considered in "draft" when the reconciliation is in process. Once the process has been completed, the document's status is changed to "submitted," which means it is awaiting review. For reconciliations that require multiple reviews, the document 108 may include a status of "first review passed," which means that the first review has been completed and the reconciliation document is ready for the final review. The document 108 is marked "final" when it has been reviewed and meets the criteria for an account to be considered reconciled.

Reconciliation

After the reconciliation document is created, the preparer uses the document for reconciling an account. The preparer can introduce source documents that evidence a transaction, add items to be reconciled, comment on the process, and ensure that any adjustments made are effective to bring the source and ledger balances back into balance.

FIG. 12 shows a reconciliation screen 1200 presented to the preparer when performing the reconciliation. The reconciliation screen 1200 includes profile field 1202, which serves a dual purpose of identifying the underlying reconciliation profile on which the document is based and providing a link back to the reconciliation profile in the event that the preparer would like to reference the information while performing the reconciliation. A document status field 1204 indicates the current status of the reconciliation document. Here, the status is "DRAFT".

A set of links 1206 are provided at the right upper corner of the reconciliation screen 1200. The links 1206 include an "add source" link that facilitates addition of a source document 1110, an "add comments" link that permits entry of comments 1112 into the reconciliation document, a "view comments" link to bring up a list of comments that have been attached to the reconciliation, and a "reconciliation period" link (not shown) that allows selection of a period 1102 to be worked on. Activities associated with selection of these links will be described below in more detail with reference to FIGS. 13 and 14.

Figure 13:
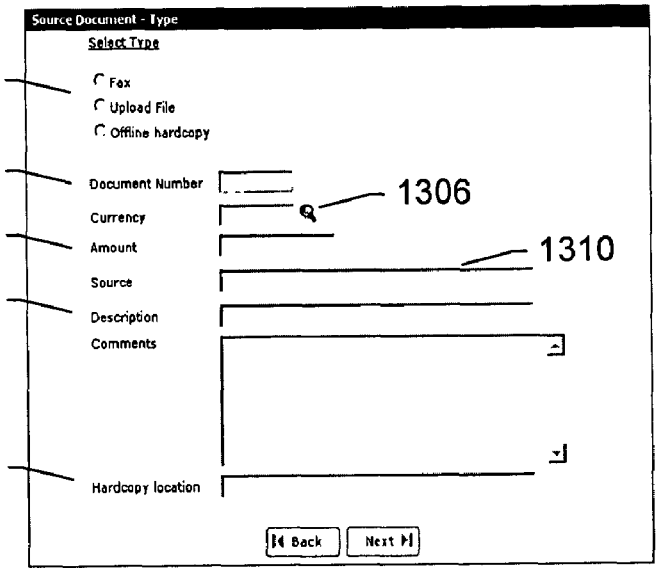
FIG. 13 shows an example of a source document screen used to add a source document to the hosting system.

FIG. 13 shows a representative source document screen 1300 that is presented when the user selects the "add source" link on reconciliation screen 1200. There are many ways to add a source document to the system. In this example, three techniques are offered: facsimile, uploading a file, and offline hardcopy. The source document screen 1300 includes a type selection area 1302 to select how the source document is added.

The source document screen 1300 provides information fields to identify the source document. A document number field 1304 allows the user to reference an actual number on the document (e.g., invoice number, admin report number, etc.) or number for personal reference if no document number exists. A currency field 1306 describes the currency of the source document. An amount field 1308 provides for the amount evidenced by the source document. A source field 1310 identifies where the document came from and a description field 1312 allows for a brief description of the source. A hardcopy location field 1314 provides the location of the hardcopy if desired at a later date for review.

Figure 14:
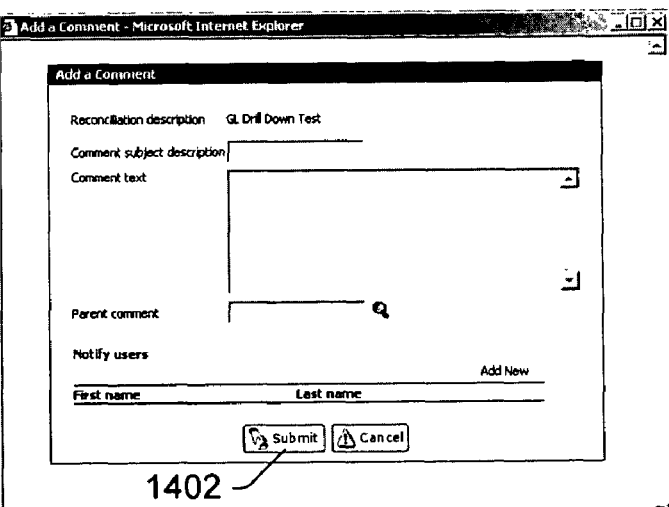
FIG. 14 shows an example of a comments screen used to add comments to the reconciliation document.

FIG. 14 shows a representative screen 1400 that is invoked when the user selects the "add comments" link. It allows the user to enter a brief subject description and then the comment. Comments can be used for a variety of purposes, such as documenting work activity on a particular reconciliation or to ask for more information about activity. Comments can be linked to each other to form a thread that records the history of activity and conversation. When completed, the user selects the "submit" button 1402 to add the comment to the reconciliation document.

With reference again to FIG. 12, the reconciliation screen 1200 has a summary area 1210 that is populated with information retrieved directly from the reconciliation profile. It includes basic information about the reconciliation being performed, such as legal entity, function, and so forth. This information is typically locked and cannot be altered by the reconciler.

Beneath the summary area 1210 is a reconciliation area 1220. This area includes a currency list 1222 that identifies one or more currencies to be reconciled. Some accounts have more than one currency and each currency is reconciled on its own merit. The currency list 1212 clearly presents the balance in the account that is attributed to each currency. In this example, the current list 1212 displays one currency at a time (e.g., US Dollars). By selecting the currency code, a user can change focus of the reconciliation area 1220 to display information pertaining to a desired currency. All items and source documents are stored according to currency so selection of a currency results in presentation of information relevant to that currency.

The currency list 1222 includes a currency code (e.g., USD for US dollars) and a difference. The difference is the current amount between the general ledger (GL) balance and the source balances, after accounting for an adjustments. The difference amount is displayed for all currencies. In this example, the difference of "0.00" indicates that the source and ledger are balanced.

It is noted that both a transactional amount and a reporting currency amount can be provided during reconciliation. These amounts might be in different currencies. With the system, a user can define at the profile level the currency in which the reconciliation is to be performed (e.g., the reconciliation is performed in the reporting currency only). When the reconciliation document is opened, only the single currency is displayed in the currency list 1212. All items and sources are of the same currency type.

The reconciliation area 1220 includes an item management section 1224 that enables management of reconciliation items related to the reconciliation. The section 1224 has an "add" link to add a single item to the reconciliation, an "upload" link to upload a list of open items from a template, and a "download" link to download a list of open items from the system to a spreadsheet program. To add a reconciliation item to the reconciliation document, the preparer activates the "add" link in the item management section 1224. This action invokes a screen for the preparer to enter new reconciliation items.

Figures 15, 16:
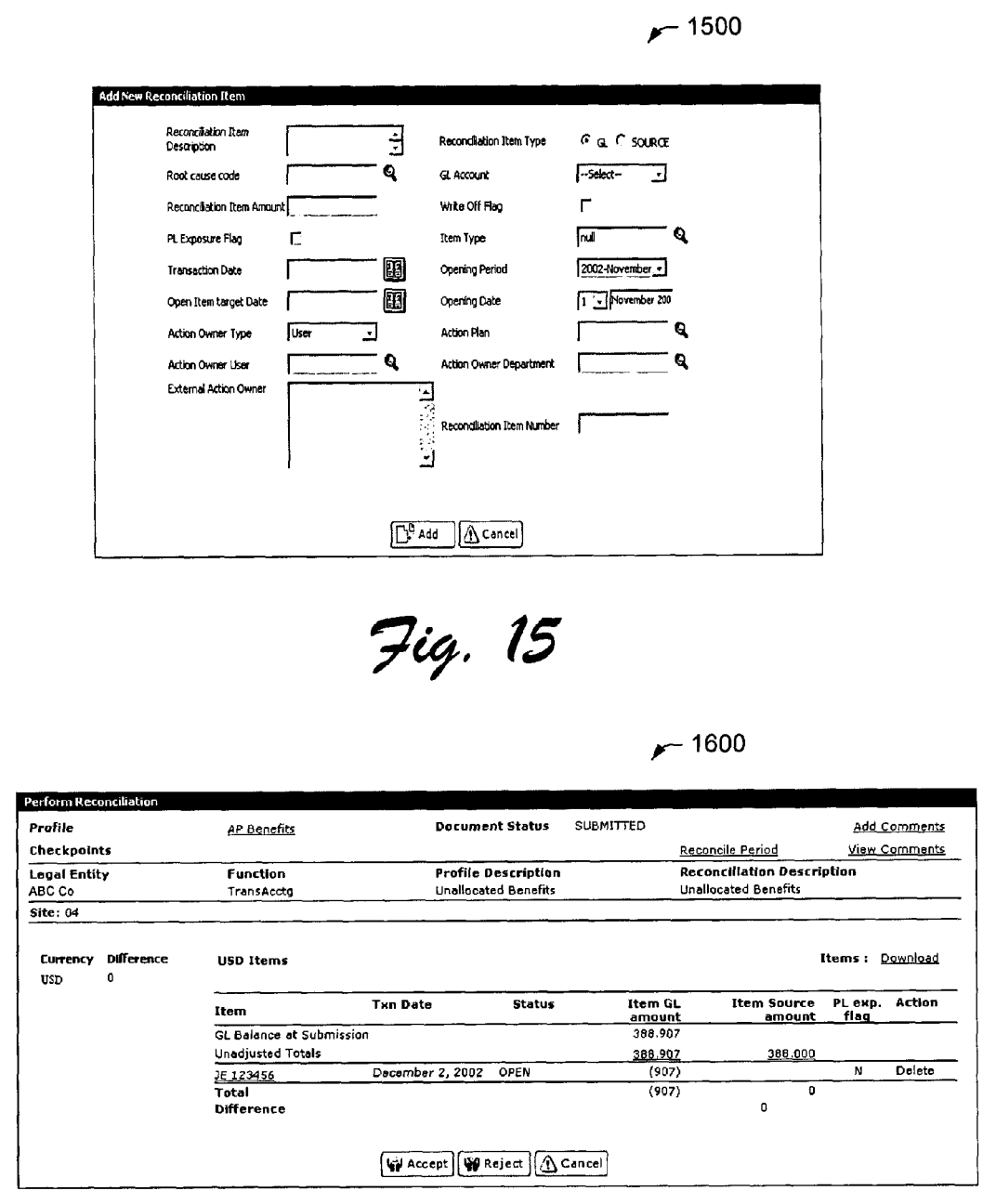

FIG. 15 shows a representative new reconciliation item screen 1500 that allows the preparer to add reconciliation items manually. The screen 1500 includes several fields used to define the reconciliation item, the associated period, and amount to be reconciled. Table 2 summarizes exemplary fields illustrated in the new reconciliation item screen 1500.

TABLE 2

Fields in New Reconciliation Item Screen 1500

| Field Name | Description of Field |
|---|---|
| Reconciliation Item Description | Free form field that allows a user to identify the reconciliation item. |
| Root Cause Code | Specifies root cause code that explains the reason for the item. A drop down menu can be used to offer the user a choice of codes. |
| Reconciliation Item Amount | Amount of the reconciliation item. |
| PL Exposure Flag | Field that can be marked to distinguish whether the item for P&L exposure. |
| Transaction Date | Date that item appeared on the source or general ledger. |
| Open Item Target Date | Target date for clearing the open item (defaults to the end of the period that the item will be due). |
| Action Owner Type | Specifies action owner type. A drop down menu may be used to offer a selection of action owner types. |
| Action Owner User | Name of person that will be responsible for clearing the reconciliation item. |
| External Action Owner | If the person tasked with clearing the item is not someone who normally accesses the system, this field allows entry of the additional person's name for tracking purposes. |
| Reconciliation Item Type | Identifies item as either GL or Source. |
| GL Account | For GL Items, the user is presented with a menu to select an account to which the item should be added. |
| Write Off Flag | Field allows the user to mark the item as a write off for reporting purposes. |
| Item Type | Specifies the type of item. A drop down menu can be used to present a set of types to choose from. |
| Opening Period | Period that the item appeared. |
| Opening Date | Date that the item appeared. |
| Action Plan | Specifies an action plan to handle the item. A drop down menu may be provided with a list of possible action plans. |
| Action Owner Department | Department in which the Action Owner resides. |
| Reconciliation Item Number | A number that corresponds to the reconciliation item for user reference. |

With reference again to FIG. 12, the reconciliation screen 1200 depicts a list of reconciliation items 1230 in the reconciliation area 1220. The items are individually identified by a code (e.g., "test item"). The code is itself a link that can be selected to examine details on individual reconciliation items. Next to the code is a transaction date for the items that are added to the source or GL categories. A status entry notes the status of the items as either open or timing. The item's GL amount is the sum balance of all accounts added to this profile based on the information contained within the GL field. The item source amount is the sum balance of all source documents added to this profile.

The item list 1230 also has a total line for the GL amounts and the source amounts that sum all values of the listed items. An adjusted total is also provided, which is the total value of the general ledger balances plus general ledger items for the GL column and the total value of the source balances plus the source items for the source column, as follows:

Adjusted Total for *GL*=*GL* Balance+*GL* Item(s)

Adjusted Total for Sources=Source Balance+Source Item(s)

In this example, the source balance initially reflected "100,000.00", whereas the associated GL balance was "0.00". This resulted in an out-of-balance condition, giving rise to the reconciliation. A reconciliation item provides an adjustment of "100,000.00" to the GL balance to remove the discrepancy.

As a result, the ledger amount and the source amounts are reconciled, and exhibited by the difference of "0.00" in the item list 1230 and the currency list 1222.

An exposure flag is can be set for each item to denote whether the associated item has any P&L (profit & loss) impact. Next to the exposure flag is an action element to shows what actions can be taken on the item. In the present example, the item can be deleted.

Once the preparer is satisfied with the values and information on the reconciliation screen 1200, the preparer can submit the reconciliation by selecting the "submit" button 1232. The status of the reconciliation will be updated to "submitted" and the reconciliation will be made available for the reviewer to complete the process. In the event that the preparer wants to make changes to the reconciliation after it has been submitted, he/she can recall the reconciliation. Recalling the reconciliation changes the status back to "draft" and removes it from the list of accounts to be reviewed, allowing the preparer time to make changes.

It is noted that the reconciliation process may be implemented to allow certain participants (e.g., business administrator) to capture billing codes as they perform reconciliations. A set of unique billing codes are established by client as master data and certain participants are able to enter valid codes.

Reviewing

After the reconciliation is performed, the reconciliation document is reviewed. The review is performed by a separate reviewer, independent of the preparer who prepared and performed the reconciliation. With reference to FIG. 2, the reviewer logs into the account reconciliation system 204 via the client device 202(2). When a secured connection is established, the reviewer is presented with the home page 208 (FIGS. 2 and 4) and is able to navigate to a page for reviewing reconciliations assigned for his/her review.

FIG. 16 shows a reconciliation review screen 1600 presented to the reviewer. It is similar to reconciliation screen 1200, which is presented to the preparer. The reconciliation review screen 1200 includes the profile field 1202, document status field 1204 (indicating "submitted"), links 1206, summary area 1210, and reconciliation area 1220. The review screen 1200 differs from the reconciliation screen 1200, however, in that the reviewer cannot add any source documents or any reconciliation items to the reconciliation. Additionally, two new controls "Accept" 1602 or "Reject" 1604 replace the "Submit" control.

If the reviewer chooses to reject a reconciliation, he or she must enter a reason for the rejection so that the preparer knows what needs to be fixed. A separate screen can be presented to allow entry of the reason. After entering the reject reason, the reviewer submits the reason and the hosting system posts a notice of the rejection to the home page in the comments section. When a reconciliation is rejected, the status of the reconciliation reverts back to "draft". Once the reconciliation is in "draft" status, the preparer will be able to work on the reconciliation and correct the issues noted by the reviewer.

When the reviewer approves the reconciliation, the system can be configured to prompt the reviewer to make sure that the reconciliation meets pre-defined business criteria. Assuming everything is in order, the reviewer may approve the reconciliation document, thereby changing the status to "final". Once a document is final, the system prevents the preparer and reviewer from making further changes to the document.

Auditing

Once the reconciliation document is reviewed and approved, it can be subsequently audited. The audit is performed by a separate auditor, independent of the preparer who prepared and performed the reconciliation and the reviewer who reviewed it. With reference to FIG. 2, the auditor logs into the account reconciliation system 204 via the client device 202(3). When a secured connection is established, the auditor is greeted with the home page 208 (FIGS. 2 and 4), where he/she will see the number of accounts assigned to him/her for auditing. Selecting the auditor link from the home page 208 navigates the auditor to a list of the assigned reconciliations.

Figures 17, 18:
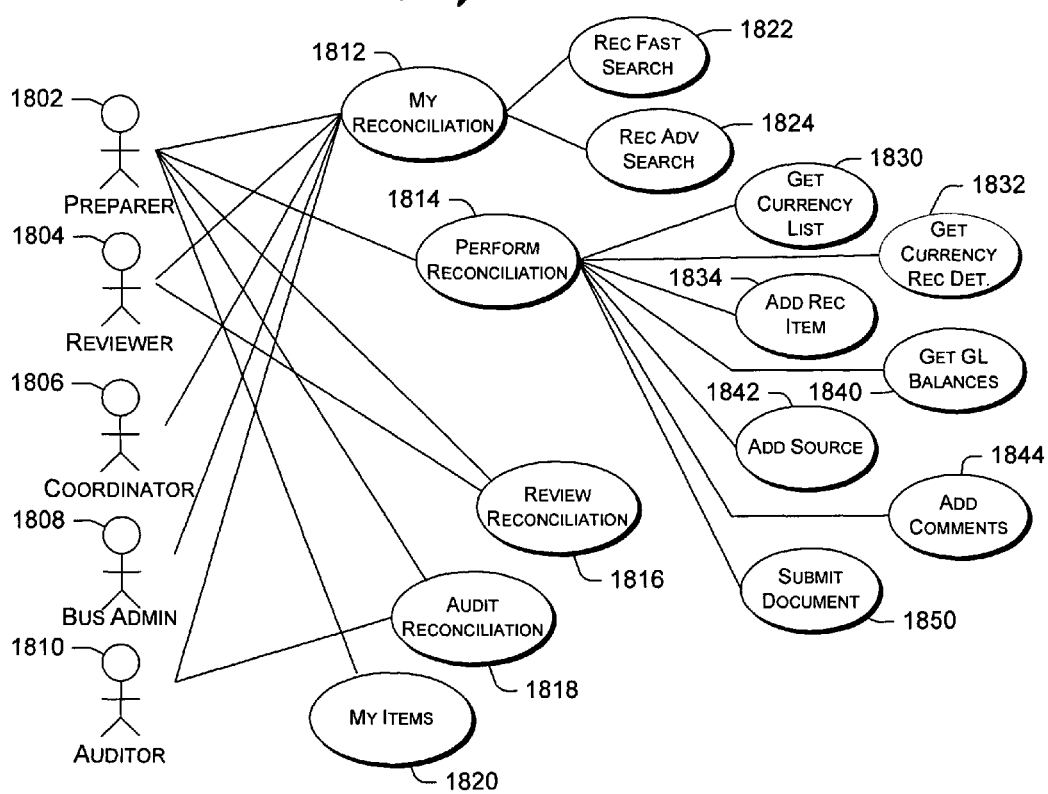
FIG. 17 shows an example list of assigned reconciliations to be audited.
FIG. 18 shows one implementation of an account reconciliation application represented in an object model format.

FIG. 17 shows an example list 1700 of assigned reconciliations. The list contains such information as the definition identifier, reconciliation description, profile code, profile description, reconciliation status, and the names of the preparer and reviewer. The definition identifier is also a link that, when selected, takes the auditor directly to the reconciliation screen 1200 (FIG. 1200). The reconciliation screen presented to the auditor looks like the screen made available to the preparer and reviewer. In this way, the auditor is able to view the reconciliation and support documentation.

If satisfied with the reconciliation, the auditor can select an "Accept" option. The system can be configured to present an additional screen that queries the auditor to confirm that all business criteria have been met. Once accepted and submitted, a confirmation screen is displayed to inform the auditor that the reconciliation has been successfully completed.

Account Reconciliation Application

As noted above with respect to FIG. 3, the account reconciliation application 340 is formed in part of objects (Java classes) 344. These classes provide functionality to perform the various operations in the account reconciliation process 100.

FIG. 18 shows a representative object model 1800 to represent the general functions performed by the application. The object classes are represented pictorially as ovals and interactions among the classes are represented by connecting lines. Five participant-related objects are represented to demonstrate their interaction with the different classes of the application. The participant objects include a preparer object 1802, a reviewer object 1804, a coordinator object 1806, a business administrator object 1808, and an auditor object 1810.

The application model 1800 contains primary object classes "My Reconciliation" 1812, "Perform Reconciliation" 1814, "Review Reconciliation" 1816, "Audit Reconciliation" 1818, and "My Items" 1820. The "My Reconciliation" class 1812 organizes the reconciliations associated with each participant, presents the reconciliations in an intuitive manner, and facilitates access to the individual reconciliations. This object class is linked to the participant objects 1802-1810.

Associated with the "My Reconciliation" class 1812 are two search classes: the "Reconciliation Fast Search" class 1822 and the "Reconciliation Advanced Search class 1824. These search classes allow users to search for reconciliations based on selected criteria such as account, ledger entity, and site from their pool of available reconciliations.

The "Perform Reconciliation" class 1814 allows preparers to perform reconciliation for profiles or profile splits. When a preparer decides to perform a reconciliation, the class 1814 includes functions to check if a reconciliation document exists for that reconciliation definition and period. A list of all pending reconciliation documents is maintained in a database table. The reconciliation documents can at various statuses, including draft, submitted, and first review passed. When the preparer finalizes the document, it is moved to a warehouse for permanent retention. For a new reconciliation document, the "Perform Reconciliation" class 1814 includes functions to create a new reconciliation document and place it in draft status. Default values are extracted from the profile and assigned to the document. A source document table is updated with the reconciliation document ID to thereby associate all source documents related to the reconciliation document.

The "Perform Reconciliation" class 1814 also includes functions to:

- Get roles and permissions of the logged in user and determine what actions he/she can perform
- Get profile header information
- Get data for currency navigation section
- Get year and month of period
- Get GL balance amount for reconciliation definition for the year and month of period and grouped on currency
- Get source documents total amounts
- Get reconciliation items total amount
- Determine differences (GL balance amount+reconciliation item amount of GL type)−(source amount+reconciliation item amount of source type)
- Sort the currency list alphabetically and select the first currency on navigation to this page
- Get the reconciliation detail section details for the default selected currency
- Get all the reconciliation items for this currency and reconciliation definition There are a number of object classes linked to the "Perform Reconciliation" object class 1814. A "Get Currency List" object class 1830 performs functions to obtain lists of all the currencies that have GL balances, source balances or item balances for that period. Differences between the adjusted GL amount and adjusted source amount are provided for every currency. A "Get Currency Reconciliation Details" object class 1832 provides details for a selected currency. An "Add Reconciliation Items" object class 1834 provides functions to add new items to reconciliation documents, where each item includes amount, currency, root cause, open period, close period, action plan and adjustments to either the source or the general ledger.

A "Get GL Balances" object class 1840 allows the user to get ledger balance amounts against every account in a currency. An "Add Source" object class 1842 performs functions to add source documents to the reconciliation documents. Source documents may be added by selecting from a pool of source documents, through electronic induction via facsimile, or by uploading them into the application server. An "Add Comments" object class 1844 performs functions to facilitate user entry of comments for reconciliation documents.

A "Submit Document" object class 1850 performs functions to move the reconciliation document from a draft status to a submitted status. Some of the functions in this class include:

- Determine if a document exists in draft status for a previous open period for the same reconciliation
- Run automated criteria tests to evaluate whether business objectives were met
- Populate results obtained from tests for each criterion and show it on the screen
- Upon submission, save GL balances for all accounts related to that document Conclusion Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

Moreover, these claims are just exemplary of possible scope and subject matter, and many combinations and sub-combinations of the features described herein are expected to become the subject of claims through many patent applications to be perfected from this provisional.

What is claimed is:

1. A hosting system for hosting one or more clients, comprising:
   a central processing unit;
   a source database to store source data pertaining to a financial account, the source data including at least one source document, the source data exhibiting a source balance;
   an application database to store ledger data pertaining to the financial account, the ledger data exhibiting a ledger balance; and
   an account reconciliation application executing, using the central processing unit, at the application database to create reconciliation documents that associate items of the ledger data with corresponding items of the source data pertaining to the financial account and determine reconciliation rules to reconcile any differences between corresponding portions of the source balance and the ledger balance, the reconciliation documents being based in part on reconciliation profiles, the reconciliation profiles determining how the financial account is to be reconciled by, at least, determining the reconciliation rules and thereby how the source balance and the ledger balance are to be reconciled, the account reconciliation application creating the reconciliation profiles by way of a profile creation screen that enables input of information used to establish the reconciliation profiles, each of the reconciliation profiles having individualized reconciliation rules for reconciliation of the financial account, wherein
   at least one of the reconciliation profiles includes supplementary information that corresponds to a past reconciliation of the financial account, the supplementary information being applied to the reconciliation of the financial account, and
   the account reconciliation application splitting at least one of the reconciliation profiles into a plurality of split profiles according to additional attributes that define the financial account.

2. The hosting system as recited in claim 1, wherein the source database comprises an image repository to store images of the source documents.

3. The hosting system as recited in claim 1, wherein the source database comprises a directory to track identity and location of hardcopies of the source documents.

4. The hosting system as recited in claim 1, wherein the application database stores the reconciliation documents.

5. The hosting system as recited in claim 1, wherein the application database stores multiple ledger data from multiple different ledgers.

6. The hosting system as recited in claim 1, wherein the application database stores the reconciliation profiles.

7. The hosting system as recited in claim 1, wherein the account reconciliation application comprises a collection of server pages to generate web pages used in the creation of the reconciliation documents and a collection of object classes to facilitate reconciliation and review of the reconciliation documents.

8. The hosting system as recited in claim 7, further comprising one or more web servers to serve the web pages to remote clients.

9. The hosting system as recited in claim 7, wherein the web pages present content written in different languages.

10. The hosting system as recited in claim 1, wherein the reconciliation documents can exhibit financial amounts in different currencies.

11. The hosting system as recited in claim 1, further comprising a reporting database system to generate reports pertaining to account reconciliation.

12. The hosting system as recited in claim 2, wherein the reconciliation profiles define how the financial account is to be reconciled by associating only a portion of the items of ledger data and the corresponding items of source data pertaining to the financial account with a particular reconciliation profile.

13. The hosting system as recited in claim 1, wherein each of the reconciliation profiles are different from each other.

14. The hosting system as recited in claim 1, wherein the reconciliation documents include reconciliation statuses corresponding to different stages in the reconciliation of the financial account.

15. The hosting system as recited in claim 1, wherein the financial account is organized according to a client, a legal entity corresponding to the client, a site location for the legal entity where transactions are processed, a general ledger entity corresponding to the legal entity, an account level, and the additional attributes, the additional attributes corresponding to account segments of the ledger data.

* * * * *